United States Patent [19]
Freeman

[11] Patent Number: 5,296,881
[45] Date of Patent: Mar. 22, 1994

[54] METHOD AND CONTACT LENSES FOR TREATING PRESBYOPIA

[75] Inventor: Michael H. Freeman, Denbigh, Wales

[73] Assignee: Pilkington Diffractive Lenses Limited, St. Helens, Wales

[21] Appl. No.: 684,223

[22] Filed: Apr. 12, 1991

[30] Foreign Application Priority Data

Apr. 17, 1990 [GB] United Kingdom ............... 9008582

[51] Int. Cl.$^5$ ................... G02C 7/04; G02B 5/18; G02B 27/42
[52] U.S. Cl. ................... 351/177; 351/162; 359/558; 359/570
[58] Field of Search ............. 351/160.R, 160.H, 161, 351/162, 177; 359/558, 570

[56] References Cited

U.S. PATENT DOCUMENTS

| | | | |
|---|---|---|---|
| 4,881,804 | 11/1989 | Cohen | 351/161 |
| 4,923,296 | 5/1990 | Erickson | 351/161 |
| 5,002,382 | 3/1991 | Saidner | 351/161 |
| 5,024,517 | 6/1991 | Saidner | 351/161 |

FOREIGN PATENT DOCUMENTS 0109753 5/1984 European Pat. Off.
201231 11/1986 European Pat. Off.

Primary Examiner—Scott J. Sugarman
Attorney, Agent, or Firm—Burns, Doane, Swecker & Mathis

[57] ABSTRACT

A method of correcting or alleviating presbyopia in humans comprising (a) fitting a first contact lens to a first eye, and (b) fitting a second contact lens to the other eye. Each of the lenses has a first power provided by the shape, curvature and material of the lens to provide a refractive corrected image and a second power provided by diffractive means to provide a second corrected image, the second power being additive to (or subtracted from) the first power. The lenses are fitted so that one has a refractive near image optical power and the other has a refractive distance image optical power, and the diffractive means of the lenses are arranged so that the amount of the light directed into the near image by one lens is substantially greater than that directed into the far image by that lens, and the amount of light directed into the far image by the other lens is substantially greater than that directed into the near image by that other lens. In this way the wearer sees an image of relatively high intensity and retains a large amount of stereoscopic vision.

6 Claims, 3 Drawing Sheets

METHOD AND CONTACT LENSES FOR TREATING PRESBYOPIA

BACKGROUND OF THE INVENTION

This invention relates to methods of correcting presbyopic vision, and more particularly to methods of correcting presbyopia by the utilisation of contact lenses.

Presbyopia is a condition of the ageing human eye wherein the eye loses its ability to focus sharply on objects throughout the normal range of vision, i.e. from distant to near objects. This condition is the result of a gradual hardening of the crystalline lens which occurs with age and prevents the ciliary muscle from completely adjusting the curvature of the lens, and thereby altering its focal length, as required for viewing distant or near objects. The condition is progressive, and cannot at present be corrected by any treatment of the eye itself. Accordingly, it is conventional to provide the patient suffering from presbyopia with bifocal corrective lenses, which may be either conventional spectacle lenses or contact lenses. In such lenses, usually one portion of the lens is adapted to provide the proper correction, if necessary, for sharp distant vision, while another portion of the lens is adapted to provide sharp near vision. In spectacles, for example, the person using the corrective lenses directs his vision through the distant vision portion or the near vision portion as necessary.

In the case of conventional spectacle lenses, the near vision zone is a segment generally located in the lower portion of the lens where the wearer may easily direct his/her vision through it for reading. In the case of a contact lens, it is also possible to have a near vision zone located in the lower portion of the lens. These are known as translating bifocal lenses.

In most attempts to provide patients with lenses to compensate for presbyopia, each eye has been provided with a bifocal lens, whether spectacle lens or contact lens, designed so that the eyes are used together, each eye viewing the object through the distant vision or near vision portion as appropriate. Thus each eye sees a focussed image of the object.

An alternative method of treating presbyopia has been used in recent years, wherein a contact lens focussed for near vision has been fitted to one eye and a contact lens focussed for distant vision to the other eye. This is commonly known as monovision.

With this arrangement, one eye presents a clear distant view (but an unclear near view) to the brain while the other presents a clear near view (but an unclear distant view). In many cases, the brain can select the desired image depending upon whether distant vision or near vision is desired, and ignore the unclear image. This arrangement has the advantage that the patient need not shift vision from one optic zone to another, which is especially troublesome in the case of translating bifocal contact lenses. However, it is believed that at most thirty percent of wearers fitted with monovision arrangements can tolerate a presbyopic vision correction of this type. In the remainder of the population, the presence of the blurred image from the eye not focussed on the intended object cannot be ignored and is so distracting that the general effect is unsatisfactory correction of the presbyopic condition.

Another method of overcoming the problems described above is fitting a presbyopic person having binocular vision with concentric bifocal contact lenses wherein one eye is provided with a contact lens having a distant vision central optic zone and a near vision peripheral optic zone, and the other eye is provided with a contact lens having a near vision central optic zone and a distant vision peripheral optic zone. The effect of these lenses is dependent on the size of the central optic zone in relation to the size of the pupil of the eye. Often this is made smaller than half the size of the normal pupil.

Presbyopic patients fitted with a pair of lenses consisting of one of each type find that they can see distant objects with both eyes but usually more clearly in the eye with the near centre lens. Near objects are also seen with both eyes, but usually more clearly in the eye with the distance centre lens. In general, there is binocular correction of both distance and near vision without the annoyance and confusion caused by the image in one eye being completely out of focus (as in monovision). This effect is achieved because each lens provides some correction for both distance and near objects, one eye being biased for distance (the near centre lens) and one eye being biased for near (the distance centre lens). Concentric bifocal lenses provide to each of the eyes two simultaneous images, one formed by the central zone and another by the peripheral zone.

The dominant image is that formed by the zone giving a larger coverage of the pupil area. For example, if the peripheral zone covers a larger area of the pupil than the central zone, the power of the peripheral zone will be dominant in forming the image. However, either the central or the peripheral zone could be constructed to cover a larger area. If the central zone was of larger area, the focus of the central area would be dominant. The eye with the lens which has the larger zone adapted for the visual task at hand is apparently selected by the brain, and the image formed in the other eye by the smaller zone of its contact lens assists in the visual task at hand.

This method effectively superimposes two images by having two focal lengths on the same axis. Each image is surrounded by the out of focus image of the other component. A problem in the wearing of such lenses is the fact that the human pupil size is not constant and varies from person to person. At small pupil sizes very little aperture is available for the distance image light and this image may be lost in the out of focus near image. At large pupil sizes the amount of light entering the eye for the near image light is very low and for reading, the near image will tend to be lost in the out of focus distance image. At less extreme pupil sizes i.e. not too large or too small, the two images will receive equal amounts of light thus making it possible to achieve good vision at both near and distance.

Another form of bifocal contact lens which is not pupil size dependent, and can be considered as a full aperture bifocal is the diffractive bifocal contact lens. In this type of lens, the whole aperture provides rays to both near and distance images. In such a lens, the diffractive power may be additive to (or subtractive from) the basic refractive power of the lens. Thus a lens may have a basic power e.g. for far vision, provided by the shape, curvature and material of the lens, and a different power e.g. a greater power for near vision provided by diffractive means on the lens so as to give a diffractive power which adds to the basic refractive power of the lens. One way of providing diffractive power is by means of a zone plate.

A bifocal lens can also be formed in which the basic refractive power is provided for near vision, and the diffractive means is provided to give negative power to the lens and effectively subsract power from the basic power of the lens to provide for distance vision. A diffractive lens nullifies the effect of pupil size and enables the lens to be designed so that the available light is divided so that about half the light goes into each image. The ratio of intensity between the near and far images may be chosen independently of the add power, pupil size or base power. Diffractive lenses as available in the marketplace are designed so that in terms of the ratio of intensity between the near and far images are substantially 0.5:0.5 in both eyes in contrast to the so-called monovision condition which is essentially 0:1 in one eye, and 1:0 in the other eye. The concentric bifocal contact lens as indicated above provides to each of the eyes two simultaneous images one formed by the central zone and the other by the peripheral zone. The dominant image is that formed by the zone giving a larger coverage of pupil area. Thus the concentric bifocal is pupil size dependent although it does overcome some of the problems associated with monvision contact lenses.

SUMMARY OF THE INVENTION

Broadly according to the present invention there is provided a method of correcting or alleviating presbyopia in a human comprising fitting contact lenses to the two eyes, at least one of the contact lenses having an optical zone adapted to provide a corrected near image and a corrected far image by reason of refractive power to provide one and diffractive power to provide the other, one of said corrected near and far images being of greater intensity than the other, and the other contact lens being adapted to provide a corrected high intensity image corresponding (in terms of near or far) to the corrected lower intensity image provided by said one contact lens. With this arrangement each eye can see a high intensity image and stereoscopy is provided for at least one of the near and far images, i.e. the image which said other contact lens provides at high intensity. That high intensity could at least in principle be 100%, i.e. said other contact lens could be a monovision lens, but preferably it is less than 100% but more than 50% (of the total light transmitted through the lens to the eye) with both contact lenses having refractive and diffractive power to provide different intensity images.

Therefore, further according to the present invention, there is provided a method of correcting or alleviating presbyopia in humans comprising (a) fitting a first contact lens to a first eye, said first contact lens having an optical zone adapted to provide a corrected near and far image for said first eye, and (b) fitting a second contact lens to the other eye, said second contact lens having an optical zone adapted to provide a corrected near and far image for said other eye, each lens having a first power provided by the shape, curvature and material of the lens to provide one corrected image and a second power provided by diffractive means to provide the other corrected image, said second power being additive to (or subtracted from) the first power, in which the diffractive means are arranged so that the amount of the light directed into the near image by one lens is substantially greater than that directed into the far image by that lens, and the amount of light directed into the far image by the other lens is substantially greater than that directed into the near image by that other lens, whereby each of the two eyes can see an image of relatively high intensity whilst retaining a large amount of stereoscopic vision.

It has been found that a pair of diffractive lenses can be manufactured so that a presbyopic subject can be provided with the ability to view both near and far images with a dominant image intensity in each eye substantially greater than 50% of the total light intensity received by that eye, and retaining a large amount of stereoscopic vision. Further little or no deterioration of vision quality related to pupil size is experienced. This is done by considering one eye as a distance eye, and the other eye a near eye, in a similar fashion to standard monovision as mentioned above. Thus, for example, the distance eye could be fitted with a lens with a base power of 3 dioptres and a diffractive add of −2 dioptres having 25% of the light going into the far (diffracted) image, and the near eye with base power of 1.00 dioptres, and a diffractive add of 2.00 dioptres, having 25% of the light going into the near (diffracted) image.

When fitting the contact lenses to a wearer in accordance with the present invention, it will be understood by those skilled in the profession that the particular arrangement of the lenses i.e. which lens is fitted to which eye, is particular to each individual. However, in most cases wearers prefer the dominant eye to provide the distance vision.

Further, it should be noted that each of the lenses fitted in accordance with the present invention provides a refractive image and a diffractive image, i.e. the lens fitted to the distance eye provides a refractive distance image and a diffractive near image and the lens fitted to the near eye provides a refractive near image and a diffractive distance image. Therefore, in accordance with the present invention preferably, the contact lenses are fitted to a wearer so that refractive distance (far) vision is provided by the dominant eye and refractive near vision is provided by the other eye.

The present invention further includes a set of contact lenses for treating presbyopia in a human comprising a pair of lenses at least one of which provides one corrected image by refractive power and another corrected image by diffractive power, the two corrected images being near and far images of different intensities, the other lens providing a corrected high intensity image corresponding (in terms of near or far) to the corrected lower intensity image provided by said one lens.

The present invention also includes a set of contact lenses for treating presbyopia in humans comprising a pair of lenses, each lens having a first power provided by the shape, curvature and material of the lens to provide one corrected image, and a second power provided by diffractive means to provide another corrected image, the lenses being paired so that one lens has diffractive means arranged so that the amount of light directed into the near image by the lens is substantially greater than that directed into the far image, and the other lens has diffractive means arranged so that the amount of light directed into the far image by the lens is substantially greater than that directed into the near image. The lenses of the pair can be fitted respectively to a patient's two eyes so that each eye sees an image of relatively high intensity, e.g. more than 50% of the total light intensity received by that eye whilst maintaining a large amount of stereoscopic vision.

Our invention also includes a set of lens as described above packaged to be sold together e.g. in a container.

The advantages of the present invention include the following:

Compared with monovision in both the prior art diffractive lenses and the arrangement of the present invention instead of having one pupil with a lens focussed for distance objects and the other pupil with a lens focussed for near objects, both eyes can obtain information regarding both distant and near objects. This also applies to the concentric bifocal contact lens arrangement referred to above. However in the case of the present invention, the amount of light associated with the image designed to be seen through one lens is consistently substantially greater than that associated with the other image regardless of pupil size, making it easier for the brain to select that image, and associate it with the dimmer image in the other lens to provide binocular vision and good visual acuity.

In comparison with the use of concentric bifocal contact lenses of opposite type (near centre, distance periphery/distance centre, near periphery) the use of diffractive effects makes the vision substantially independent of pupil size effects. This means that the eye which has predominantly near vision will retain this condition independently of pupil size, and likewise the distance vision in the companion eye. This is a more stable condition to which the patient can adapt in the same way, but to a lesser extreme, as monovision. The effect with concentric bifocal lenses whereby the dominant near vision changes eye as the light level changes (thus changing the pupil size) is a more complicated condition to adapt to.

The choice of which lens to wear in which eye will be a matter of wearer preference, and may in fact be related to individual pupil size or eye conditions. Most people prefer to have best distance vision, and may find that one eye gives better distance vision than the other.

BRIEF DESCRIPTION OF THE DRAWINGS

The invention will now be illustrated, by way of description of an example in accordance with the present invention, with reference to the accompanying drawings, in which.

DESCRIPTION OF THE PREFERRED EMBODIMENTS

Figure 1:
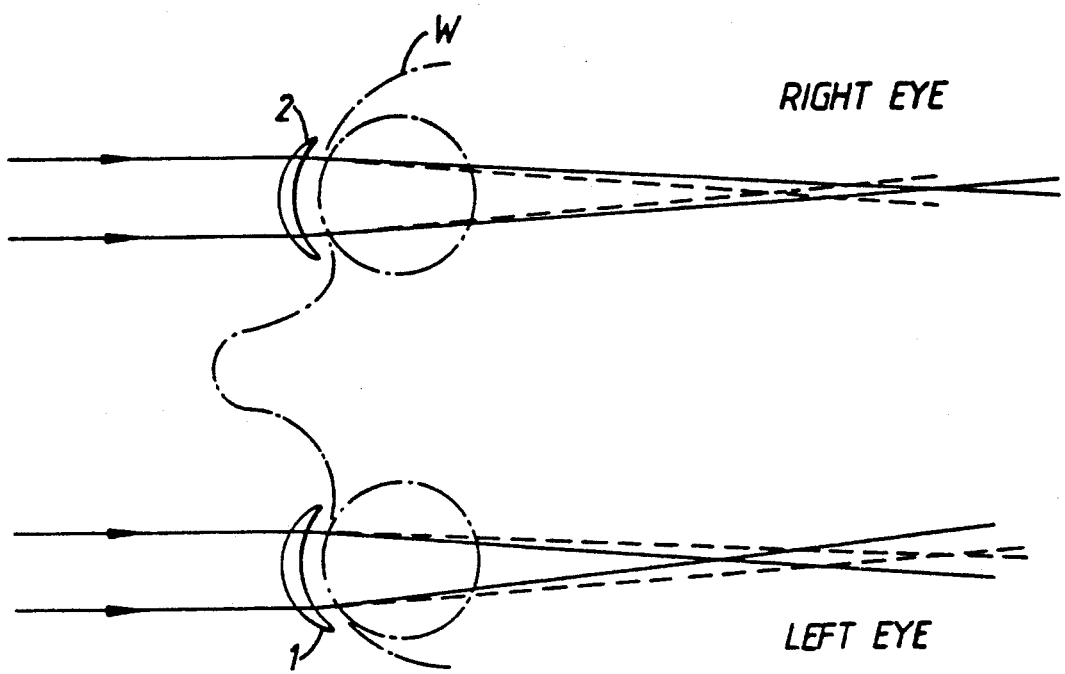
FIG. 1 shows a schematic representation of the principles behind the present invention.

Now referring to FIG. 1 of the accompanying drawings, a schematic representation of the operation of the present invention is shown.

The wearer W is shown in dotted plan view. In the particular arrangement shown the wearer has a first contact lens 1 fitted to the left eye and a second contact lens 2 fitted to the right eye.

The first contact lens 1 is designed and constructed so that the refractive image is the near image and the diffractive image is the distant image. For example, the left eye is designated the near eye and is fitted with a lens having a refractive optical power (base power) of +1 dioptre and a diffractive additive optical power of +2 dioptres with 25% of the light going into the diffractive image. Consequently, the lens has the following characteristics:

near image—refractive, 1 dioptre, 75% of the light and distant image—diffractive, 3 dioptres, 25% of the light.

The second contact lens 2 is designed and constructed so that the contrary position is the case, i.e. the refractive image is the distant image and the diffractive image is the near image.

For example, in order to complement the example for the left eye, the right eye is designated the distant eye and is fitted with a lens having a refractive optical power (base power) of +3 dioptres and a diffractive additive optical power of −2 dioptres with 25% of the light going into the diffractive image. Consequently, the lens has the following characteristics:

near image—diffractive, 1 dioptre, 25% of the light and distant image—refractive, 3 dioptres, 75% of the light.

The actual choice of which contact lens goes in which eye is based on several factors. However most people prefer the distance (far) vision to be provided by the dominant eye. As a majority of people are right eye dominant, FIG. 1 has been drawn to represent this situation.

In FIG. 1, the refractive images are shown in solid line profile and the diffractive images are shown in dotted line profile. Both of the contact lenses have been designed so that the diffractive image is weaker than the refractive image. However, the image is present and provides a significantly increased amount of stereo acuity.

Now referring to FIGS. 2a to 2d of the accompanying drawings there is shown some comparative data using a) conventional diffractive lenses—× b) conventional monovision arrangement—+ c) lenses in accordance with the present invention 0.

Figure 2A:
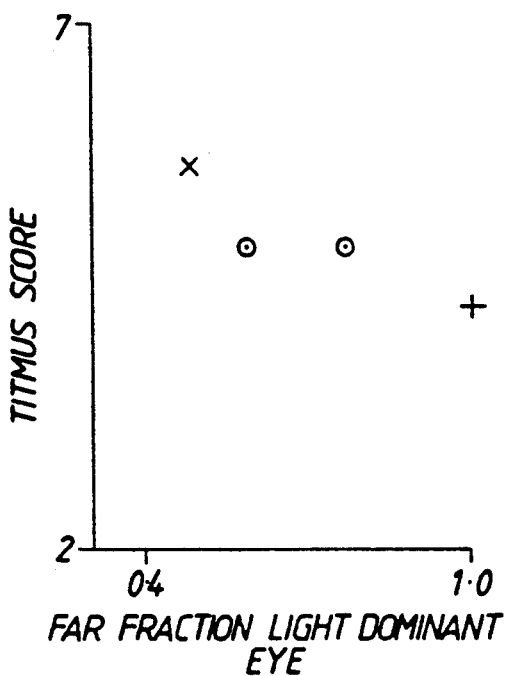
FIGS. 2A, 2B, 2C and 2D shows some comparative data of the performance of the present invention.
Figure 2B:
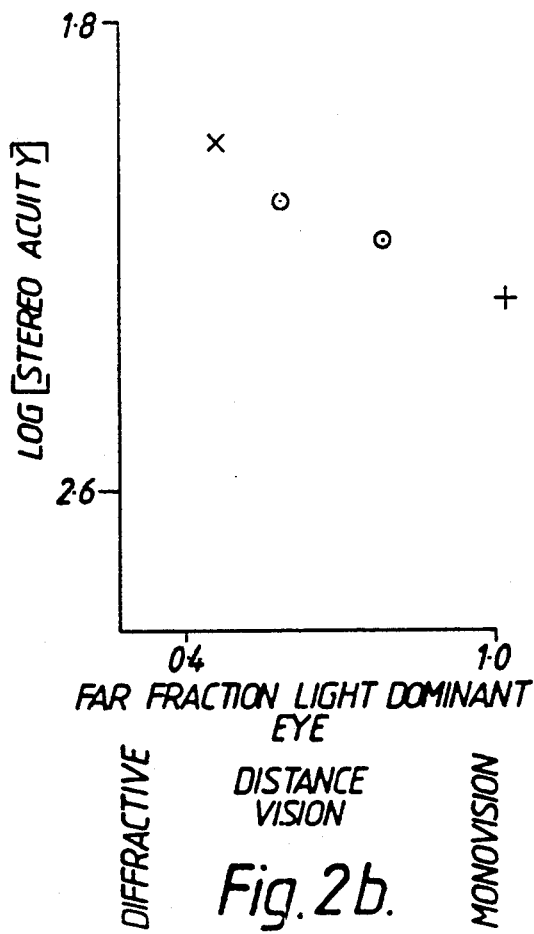
Figure 2C:
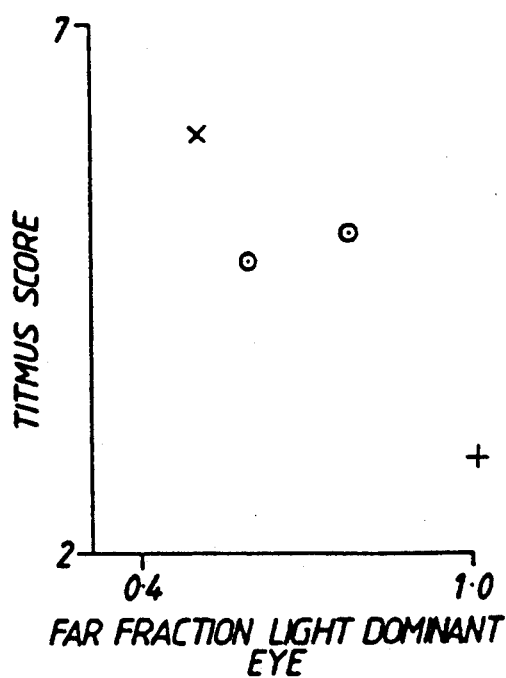
Figure 2D:
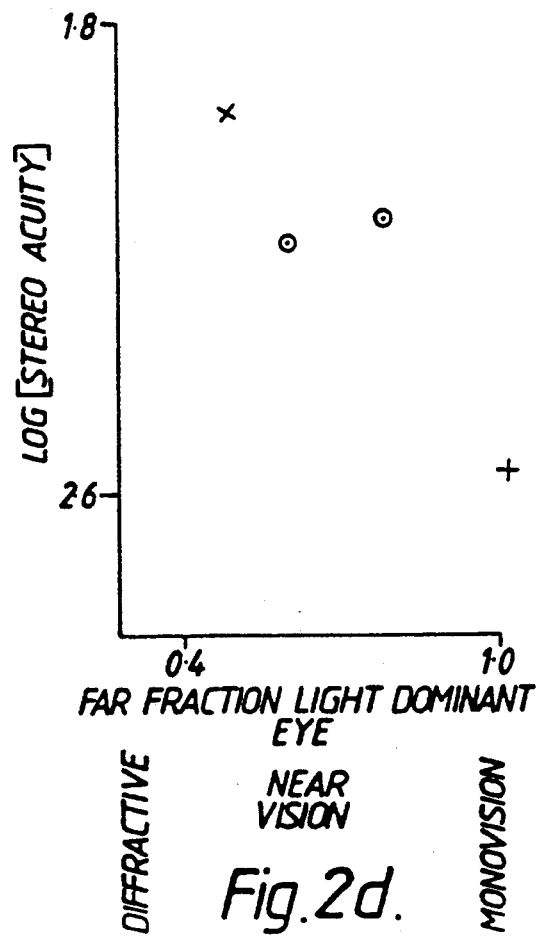

The comparative data is provided in the form of graphs where FIGS. 2a and 2b relate to distance vision and FIGS. 2c and 2d relate to near vision. The data is shown in two forms for each eye, that is log [Stereo Acuity] and Titmus score, both of which are readily accepted measures of Stereo Acuity. The Titmus test is normally administered as a near-vision test and the assessment of the present invention for distance vision is carried out in the same way but with the inclusion in a trial frame worn by the subject of positive lenses of power equal to the add of the contact lens modality. The data are mean values over eight subjects and the reduction of the Titmus score to log stereo acuity values is taken before the means are calculated for FIGS. 2b and 2d.

From this data it is clearly apparent that the arrangement of the present invention provides stereo acuity to the wearer in advance of that which will be present with the standard monovision arrangement, but not as great as with standard diffractive lenses. However the arrangement of the present invention alleviates the problems concerning light intensity associated with standard diffractive lenses. Consequently, the present invention provides a balance between the standard monovision and standard diffractive lenses which is more readily accepted by the wearer.

In the example specifically described above the two lenses are of equal and opposite effect. It will be understood that this, while convenient and often desirable, is not essential and that the image intensity proportion (75:25 in the example) may, while still of opposite effect, not be equal for the two lenses. It will further be understood that the 75:25 ratio is given by way of example and other ratios could be employed. In an extreme, as mentioned previously, one refractive/diffractive contact lens providing two (near and far) images of different intensities could be paired with a monovision contact lens (effectively 100:0 image intensity proportion) providing one high intensity image, that high intensity image corresponding (in terms of near or far) to the low intensity image of the refractive/diffractive lens. That would provide stereoscopy for that image, the other (near or far image) being seen at high intensity by the eye wearing the refractive/diffractive lens.

I claim:

1. A method of correcting or alleviating presbyopia in humans, comprising:

fitting a first contact lens to a first eye, said first contact lens having an optical zone adapted to provide a corrected near and far image for said first eye; and fitting a second contact lens to the second eye, said second contact lens having an optical zone adapted to provide a corrected far and near image for said second eye, wherein each of said first and second contact lenses has an optical zone with a first power provided by the shape, curvature and material of the lens to provide one corrected image and a second power provided by diffractive means which is additive to, or subtractive from, said first power to provide a second corrected image, the diffractive means being arranged so that the amount of light directed into the near image by the first contact lens is substantially greater than that directed into the far image by that lens, and the light directed into the far image by the second contact lens is substantially greater than that directed into the near image by that lens, so that each of the eyes sees one of the two images as being of relatively high intensity while maintaining a large amount of stereoscopic vision.

2. A method in accordance with claim 1, wherein the contact lenses are fitted to a wearer so that refractive distance vision is provided by the dominant eye and refractive near vision is provided by the other eye.

3. A method in accordance with claim 1, wherein the distance eye is fitted with a lens having a refractive base power for distance images and a diffractive additive optical power of −2 dioptres with 25% of the light going into the diffractive image for near images, and the near eye is fitted with a lens having a refractive base power for near images and a diffractive additive optical power of +2 dioptres with 25% of the light going into the diffractive image for distance images.

4. A method in accordance with claim 2, wherein the distance eye is fitted with a lens having a refractive base power for distance images and a diffractive additive optical power of −2 dioptres with 25% of the light going into the diffractive image for near images, and the near eye is fitted with a lens having a refractive base power for near images and a diffractive additive optical power of +2 dioptres with 25% of the light going into the diffractive image for distance images.

5. A set of contact lenses for treating presbyopia in a human comprising a pair of lenses at least one of which provides one corrected image by refractive power and another corrected image by diffractive power, the two corrected images being near and far images of different intensities, the other lens providing a corrected high intensity image corresponding, in terms of near or far, to the corrected lower intensity image provided by said one lens.

6. A set of contact lenses for treating presbyopia in humans comprising a pair of lenses, each lens having a first power provided by the shape, curvature and material of the lens to provide one corrected image, and a second power provided by diffractive means to provide another corrected image, the lenses being paired so that one lens has diffractive means arranged so that the amount of light directed into the near image by the lens is substantially greater than that directed into the far image, and the other lens has diffractive means arranged so that the amount of light directed into the far image by the lens is substantially greater than that directed into the near image.

* * * * *